United States Patent
Li et al.

(10) Patent No.: US 12,207,075 B2
(45) Date of Patent: *Jan. 21, 2025

(54) SYSTEM FOR GENERATING SPATIAL AUDIO WITH UNIFORM REVERBERATION IN REAL-TIME COMMUNICATION

(71) Applicant: Agora Lab, Inc., Santa Clara, CA (US)

(72) Inventors: Song Li, Shanghai (CN); Jianyuan Feng, Shanghai (CN); Bo Wu, Shanghai (CN); Jimeng Zheng, Shanghai (CN)

(73) Assignee: Agora Lab, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/592,691

(22) Filed: Mar. 1, 2024

(65) Prior Publication Data

US 2024/0205635 A1 Jun. 20, 2024

Related U.S. Application Data

(63) Continuation of application No. 17/859,181, filed on Jul. 7, 2022, now Pat. No. 11,950,088.

(51) Int. Cl.
*H04R 5/02* (2006.01)
*H04R 3/04* (2006.01)
(Continued)

(52) U.S. Cl.
CPC ............... *H04S 7/306* (2013.01); *H04R 3/04* (2013.01); *H04S 1/007* (2013.01); *H04L 65/403* (2013.01);
(Continued)

(58) Field of Classification Search
CPC ...... H04S 7/306; H04S 1/007; H04S 2400/11; H04S 2420/01; H04R 3/04; H04L 65/403
(Continued)

(56) References Cited

U.S. PATENT DOCUMENTS 8,958,567 B2   2/2015   Tsingos et al.
9,426,300 B2   8/2016   Kim et al.
(Continued)

OTHER PUBLICATIONS

Grouped Feedback Delay Networks for Modeling of Coupled Spaces, JAES vol. 69 Issue 7/8 pp. 486-496, Jul. 2021, 3. O. Das, J. S. Abel, Das, Orchisama, https://www.researchgate.net/publication/353022960.
(Continued)

*Primary Examiner* — Ammar T Hamid
(74) *Attorney, Agent, or Firm* — The Law Offices of Konrad Sherinian, LLC; Depeng Bi

(57) ABSTRACT

A real-time communication software application for generating spatial audio with uniform reverberation in a real-time communication session is performed by an electronic communication device. The application is adapted to remove the reverberation of recorded speech signals from far-end participants by the dereverberation approach, render the direct sound parts by filtering the output signals by head-related transfer functions of desired directions, generate reverberant sound parts by convolving the output signals from with uniform room impulse responses or an artificial reverberator, and combine direct and reverberant sound components to generate spatialized speech signals. When speakers and listeners are located in two virtual conference rooms, the reverberation of the two rooms are coupled. The reverberant sound parts are then generated by convolving the output signals and coupled RIRs from the two rooms.

17 Claims, 8 Drawing Sheets

(51) Int. Cl.
    *H04S 1/00*         (2006.01)
    *H04S 7/00*         (2006.01)
    *H04L 65/403*     (2022.01)

(52) U.S. Cl.
    CPC ....... *H04S 2400/11* (2013.01); *H04S 2420/01* (2013.01)

(58) Field of Classification Search
    USPC .................................................. 381/303, 300
    See application file for complete search history.

(56) References Cited

U.S. PATENT DOCUMENTS 11,950,088 B2 *   4/2024   Li ........................... H04S 7/306
2016/0323454 A1 *  11/2016  Kim ......................... H04R 3/04

OTHER PUBLICATIONS

Perceptual Evaluation of Model- and Signal-Based Predictors of the Mixing Time in Binaural Room Impulse Responses, LINDAU, et al., J. Audio Eng. Soc., vol. 60, No. 11, Nov. 2012.

* cited by examiner

SYSTEM FOR GENERATING SPATIAL AUDIO WITH UNIFORM REVERBERATION IN REAL-TIME COMMUNICATION

CROSS REFERENCE TO RELATED APPLICATIONS

This application is a continuation of U.S. patent application Ser. No. 17/859,181, entitled "SYSTEM AND METHOD FOR GENERATING SPATIAL AUDIO WITH UNIFORM REVERBERATION IN REAL-TIME COMMUNICATION", filed Jul. 7, 2022, which is hereby incorporated by reference in its entirety.

FIELD OF THE DISCLOSURE

The present invention generally relates to audio signal processing in real-time communications, and more particularly relates to spatial audio generation with uniform reverberation in real-time communication. More particularly still, the present disclosure relates to a system and method for generating spatial audio with uniform reverberation in real-time virtual reality communication.

DESCRIPTION OF BACKGROUND

Technological advances enable real-time audio, video and/or message communications (RTC) over the Internet. In RTC, all participants can exchange information instantly, or with negligible latency or transmission delay. An important application of RTC is teleconferencing, such as an audio conference call or a video conference call. In teleconferencing, the use of headsets (also interchangeably referred to as headphones) by the participants is common. Binaural technologies make it possible to spatialize the speech signals received by the near-end participants. As used herein, two participants in a same physical setting, such as a room, are termed near-end participants to each other. Otherwise, they are referred to herein as far-end participants to each other. Furthermore, the voice of a participant is also referred to herein as near-end voice to the same participant. In other words, the participant is a near-end participant to the same participant.

Spatialization allows a participant to virtually place far-end participants in any way she/he desires. The conventional solution for creating virtual sounds is to filter the received monaural speech signals with a pair of head-related transfer functions (HRTFs) that describe the direction-dependent transfer functions between the sound source and listeners' eardrums. In addition, reverberation (such as early reflections and late reverberation) is added to the binaural sounds to increase the plausibility and externalization of perceived virtual sounds.

Virtual reality (VR) communication is one form of RTC. In virtual reality (VR) scenarios, participants are in the same virtual conference room. The reverberation of speech signals should thus be the same (meaning uniform). Otherwise, the immersive experience would be degraded. However, such an effect may not be easy to achieve because the participants are in different physical environments and the speech signals captured by microphones already contain the reverberation of different rooms. In addition, the speaker cannot perceive her/his voice as if she/he is speaking in a virtual conference room because the speaker's voice contains the reverberation of the local room. If the speaker wears a headphone while speaking, the headphone housing blocks the high-head frequency components of the speaker's own voice that travels through the air. As phone a result, the low-frequency part of the sound is boosted at the eardrum, which is known as the occlusion effect. The speaker's own voice then does not sound natural. The high-frequency components should not be affected by the headphone housing.

Accordingly, there is a need for a new real-time communication system and method that generate provide uniform reverberation in virtual reality communications. The new system and method increase and create an immersive experience for both listeners and speakers in the same virtual conference room or different virtual conference rooms.

SUMMARY OF THE DISCLOSURE

Generally speaking, pursuant to the various embodiments, the present disclosure provides a computer-implemented method for generating spatial audio with uniform reverberation in a real-time communication session. The method is performed by a real-time communication software application within an electronic communication device and includes retrieving a first stream of audio signals from a first electronic communication device; removing reverberation from the first stream of audio signals to generate a first stream of dry signals; filtering the first stream of dry signals through a head-related transfer function to generate a first direct parts of binaural sounds for a listener; retrieving a second stream of audio signals from a second electronic communication device; removing reverberation from the second stream of audio signals to generate a second stream of dry signals; filtering the second stream of dry signals through a head-related transfer function to generate a second direct parts of binaural sounds for the listener; summing the first and second streams of dry signals to generate summed dry signals; convolving the summed dry signals with a set of room impulse responses to generate reverberant sound parts of binaural sounds; summing the first and second direct parts of binaural sounds to generate summed direct parts of left ear binaural sounds; summing the first and second direct parts of binaural sounds to generate summed direct parts of right ear binaural sounds; summing the summed direct parts of left ear binaural sounds with the reverberant sound parts of binaural sounds to generate audio signals for the listener's left ear; and summing the summed direct parts of right ear binaural sounds with the reverberant sound parts of binaural sounds to generate audio signals for the listener's left ear. The real-time communication session is a real-time virtual reality communication session. In one implementation, the set of room impulse responses consists of a pair of room impulse responses. Each room impulse response within the set of room impulses is measured from a reference conference room or artificially synthesized. Removing reverberation from the first stream of audio signals to generate the first stream of dry signals uses a dereverberation model. Removing reverberation from the second stream of audio signals to generate the second stream of dry signals uses the dereverberation model.

Further in accordance with the present teachings is a computer-implemented method for generating spatial audio with uniform reverberation in a real-time communication session. The method is performed by a real-time communication software application within an electronic communication device and includes retrieving a first stream of audio signals from a first electronic communication device; removing reverberation from the first stream of audio signals to generate a first stream of dry signals; filtering the first stream of dry signals through a head-related transfer function to generate a first direct parts of left ear binaural sounds for a listener; retrieving a second stream of audio signals from a second electronic communication device; removing reverberation from the second stream of audio signals to generate a second stream of dry signals; filtering the second stream of dry signals through a head-related transfer function to generate a second direct parts of right ear binaural sounds for the listener; generating first early reflections for a first far-end participant corresponding to the first electronic communication device; generating second early reflections for a second far-end participant corresponding to the second electronic communication device; summing the first and second streams of dry signals to generate summed dry signals; convolving the summed dry signals with a set of room impulse responses to generate reverberant sound parts of binaural sounds; summing the first and second direct parts of binaural sounds to generate summed direct parts of left ear binaural sounds; summing the first and second direct parts of binaural sounds to generate summed direct parts of right ear binaural sounds; summing the first and second early reflections to generate first summed early reflections for a left ear of the listener; summing the first and second early reflections to generate second summed early reflections for a right ear of the listener; summing the first summed direct parts of left ear binaural sounds and the first summed early reflections for the left ear; summing the first summed direct parts of left ear binaural sounds and the first summed early reflections for the left ear to generate first summed direct parts of binaural sounds with early reflections for the left ear; summing the second summed direct parts of right ear binaural sounds and the second summed early reflections for the right ear to generate second summed direct parts of binaural sounds with early reflections for the right ear; summing the first summed direct parts of binaural sounds with early reflections for the left ear and the reverberant sound parts of binaural sounds to generate audio signals for the left ear; and summing the second summed direct parts of binaural sounds with early reflections for the right ear and the reverberant sound parts of binaural sounds to generate audio signals for the right ear. The real-time communication session is a real-time virtual reality communication session. The set of room impulse responses consists of a pair of room impulse responses. Each room impulse response within the set of room impulses is measured from a reference conference room or artificially synthesized. Removing reverberation from the first stream of audio signals to generate the first stream of dry signals uses a dereverberation model. Removing reverberation from the second stream of signals to generate the second stream of dry signals uses the dereverberation model.

Further in accordance with the present teachings is a computer-implemented method for generating spatial audio with uniform reverberation in a real-time communication session for a user with a headset on. The method is performed by a real-time communication software application within an electronic communication device and includes retrieving a stream of audio signals of the user's speech from an audio input interface of the electronic communication device; removing reverberation from the stream of audio signals to generate a stream of dry signals; convolving the stream of dry signals with a set of room impulse responses to generate reverberant sound parts of binaural sounds; filtering the reverberant sound parts of binaural sounds through a high-pass filter, thereby forming high-pass filtered signals; filtering the high-pass filtered signals through a mouth-ear transfer function, thereby forming mouth-ear transfer function filtered signals; filtering the mouth-ear transfer function filtered signals through a set of headphone compensation filters to generate audio signal for the user's left ear; and filtering the mouth-ear transfer function filtered signals through a set of headphone compensation filters to generate audio signal for the user's right ear. The real-time communication session is a real-time virtual reality communication session. The set of room impulse responses consists of a pair of room impulse responses. Each room impulse response within the set of room impulses is measured from a reference conference room or artificially synthesized. The removing reverberation from the stream of audio signals to generate the stream of dry signals uses a dereverberation model.

BRIEF DESCRIPTION OF THE DRAWINGS

Although the characteristic features of this disclosure will be particularly pointed out in the claims, the invention itself, and the manner in which it may be made and used, may be better understood by referring to the following description taken in connection with the accompanying drawings forming a part hereof, wherein like reference numerals refer to like parts throughout the several views and in which:

A person of ordinary skills in the art will appreciate that elements of the figures above are illustrated for simplicity and clarity, and are not necessarily drawn to scale. The dimensions of some elements in the figures may have been exaggerated relative to other elements to help understanding of the present teachings. Furthermore, a particular order in which certain elements, parts, components, modules, steps, actions, events and/or processes are described or illustrated may not be actually required. A person of ordinary skill in the art will appreciate that, for the purpose of simplicity and clarity of illustration, some commonly known and well-understood elements that are useful and/or necessary in a commercially feasible embodiment may not be depicted in order to provide a clear view of various embodiments in accordance with the present teachings.

DETAILED DESCRIPTION

Figure 1:
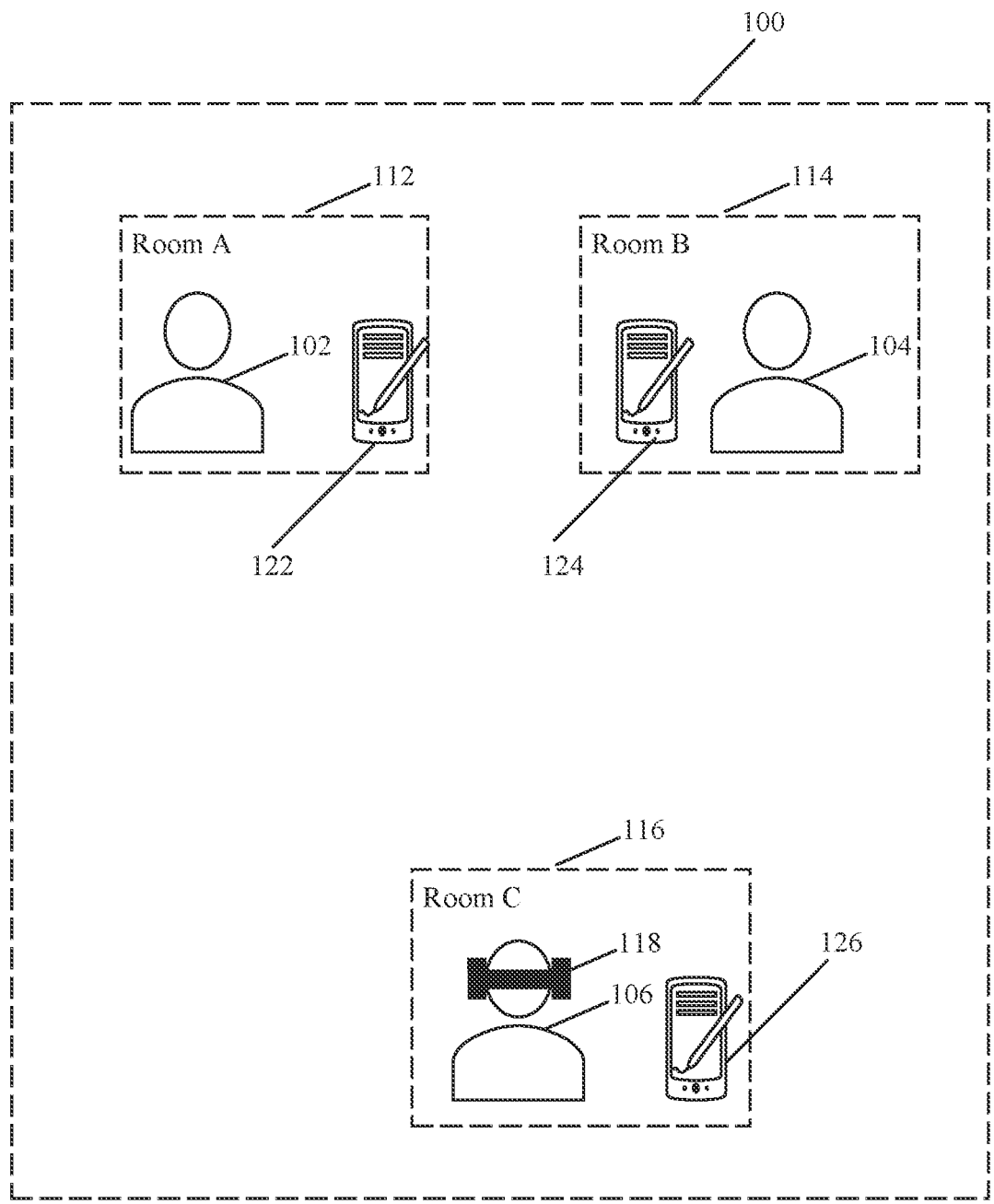
FIG. 1 is a simplified block diagram illustrating a virtual conference room in real-time communication in accordance with this disclosure.

The new real-time (RT) spatial audio rendering system provides uniform reverberation to participants in a virtual reality real-time communication session over the Internet. An illustrative virtual conference room is shown in FIG. 1 and generally indicated at 100. The virtual conference room, such as a virtual reality conference room, 100 includes three participants 102, 104 and 106 located inside three separate physical rooms 112, 114 and 116. The participants 102-104 are far-end to the participant 106, who wears a headphone (or a headset, such as a virtual reality headset device) 118 in one implementation or uses an audio output device, such as a speaker system operatively coupled to the device 126, in a different implementation.

The participants 102-106 each operate (or otherwise uses) an electronic communication device, 122, 124 and 126 respectively, to participate in the real-time communication session between them over a network, such as the Internet. In one implementation, the session is a real-time virtual reality communication session. The electronic communication device can be, for example, a smartphone, a tablet computer, a laptop computer, a desktop computer, etc. The electronic communication devices, such as the device 122, are further illustrated by reference to FIG. 7.

Figure 7:
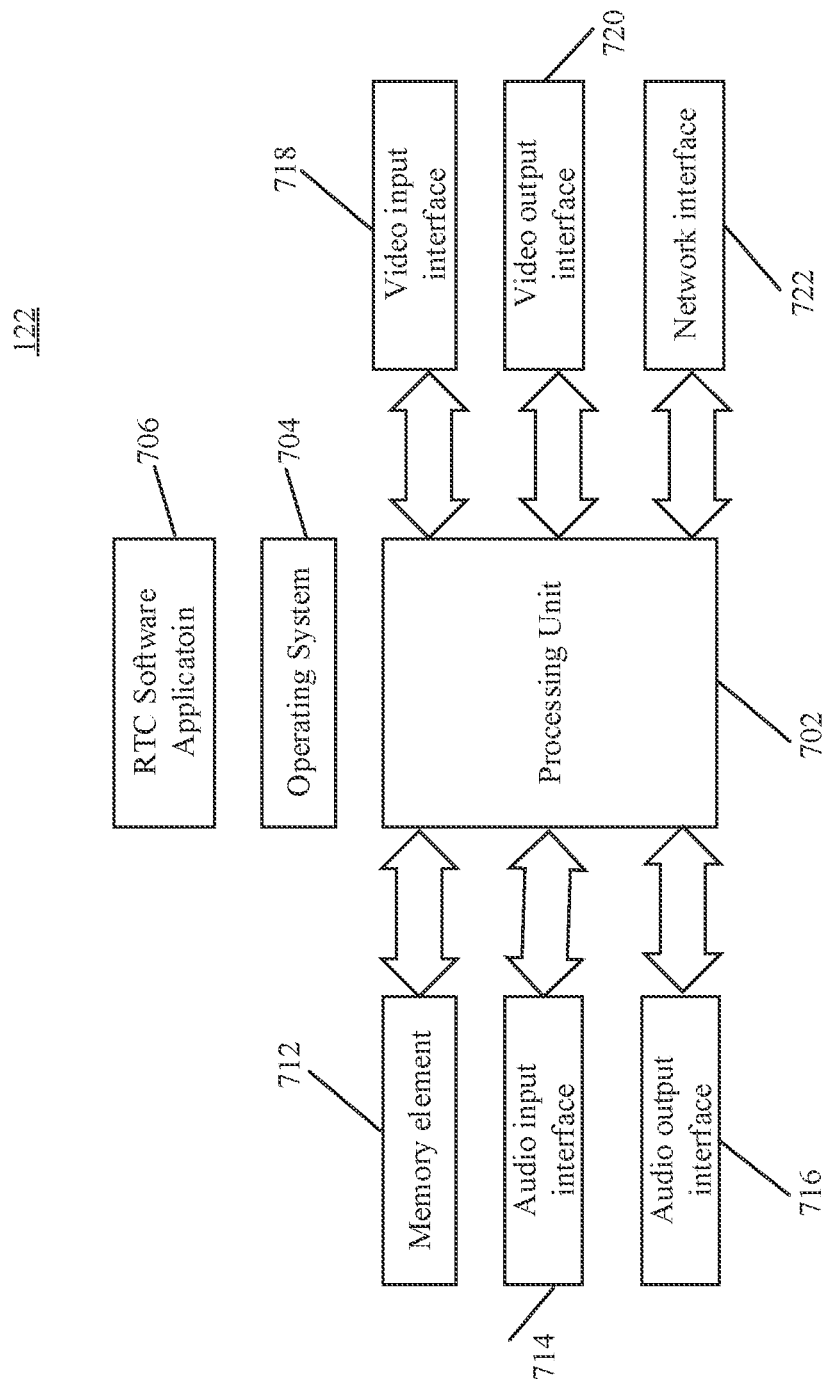
FIG. 7 is a simplified block diagram illustrating an electronic communication device in accordance with this disclosure.

Referring now to FIG. 7, a block diagram illustrating an electronic communication device, such as the 122 is shown. The electronic device 122 includes a processing unit (such as a central processing unit (CPU)) 702, some amount of memory 712 operatively coupled to the processing unit 702, an audio input interface (such as a microphone) 714 operatively coupled to the processing unit 702, an audio output interface 716 (such as a speaker) operatively coupled to the processing unit 702, a video input interface 718 (such as a camera) operatively coupled to the processing unit 702, a video output interface 720 (such as a video controller and display screen) operatively coupled to the processing unit 702, and a network interface 722 operatively coupled to the processing unit 702. The device 122 also includes an operating system 704 in some implementations and a specialized real-time communication software application 706 adapted to be executed by the processing unit 702. The real-time communication software application 706 is programmed using one or more computer programming languages, such as C, C++, C#, Java, etc. It includes components and modules for generating spatial sounds uniform reverberation.

Reverberation provides the sense of dimensions of the virtual room size. Too much reverberation may reduce the intelligibility and is thus not suitable for certain situations, such as virtual conference over the Internet with multiple participants. The traditional dereverberation method (meaning a method to remove reverberation), such as the Weighted Prediction Error (WPE) method, requires multiple audio channels as input. However, in the RTC scenarios, many devices can only support mono audio capturing. For mono channel audio dereverberation, one of the conventional solutions is to use machine learning (ML) based dereverberation methods, which are capable of mono speech dereverberation and show better results compared to other conventional methods. The ML-based dereverberation methods require pairs of dry speech signals (meaning speech signals without reverberation) and wet speech signals (meaning speech signals with reverberation) datasets and a noise dataset as the training data to train a dereverberation model. In order to enhance the performance of the dereverberation model in a noisy environment, in the training procedure, noise is often added to the wet speech signals as the input of the model, while the dry speech signals are used as the output of the model. After the model training, the model is learned to recover dry speech signals from wet speech signals even if the speech is noisy. The principle of the model is, for example, the convolutional neural network (CNN), recurrent neural network (RNN), attention-based neural network (ANN), etc. It can also be a combination of some of the networks.

Figure 2A:
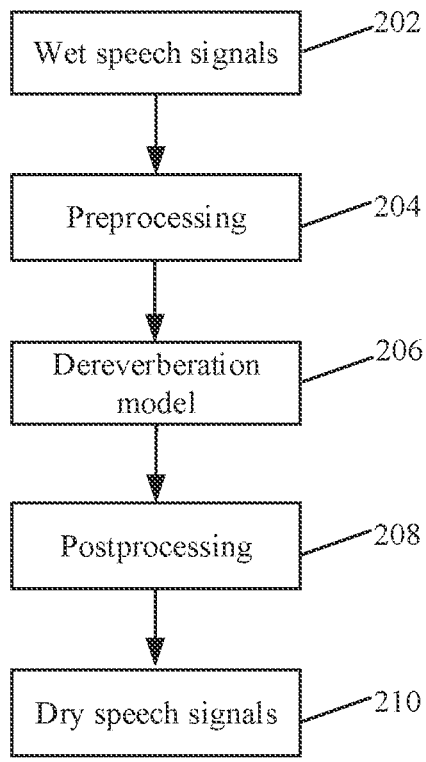
FIG. 2A is a flowchart illustrating a process by which wet audio signals are processed to generate dry audio signals in accordance with this disclosure.
Figure 2B:
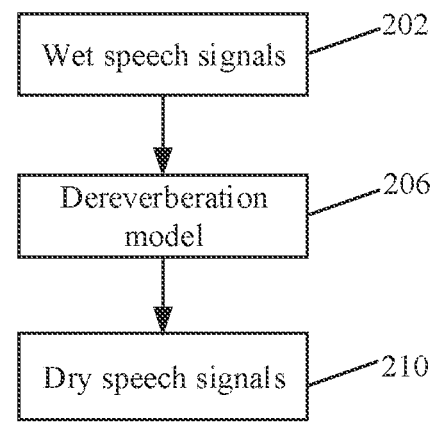
FIG. 2B is a flowchart illustrating a process by which wet audio signals are processed to generate dry audio signals in accordance with this disclosure.

The dereverberation processes of applying a conventional ML-based dereverberation model are described in FIGS. 2A and 2B and generally indicated at 200 and 250 respectively. The dereverberation processes 200 and 250 are performed by the specialized real-time communication software application 706. Via the process 220, the specialized real-time communication software application 706 predicts the spectrum of the dry speech signal. At 204, the specialized real-time communication software application 706 performs a preprocessing on the wet speech signals 202 using, for example, a short-time Fourier transformation (STFT). It converts the waveform wet signals 702 to spectrum as the input of the trained dereverberation model 206. The model 206 outputs the dry signals spectrum. At 208, an inverse STFT (iSTFT) is used as the postprocessing to obtain the waveform of dry signals 210. Alternatively, the specialized real-time communication software application 706 predicts the dry speech signal directly, which is shown by the process 250. In such a case, the trained dereverberation model 206 is also referred to herein as an end-to-end model. The end-to-end model does not require preprocessing 204 or the postprocessing 208.

The present teachings provide a system and a method for generating spatial sounds from, for example, far-end participants (such as the users 102-104 to the user 106) and near-end participants with uniform reverberation in VR scenarios. The user 106 listens to the audio with the headphone 108. The process, performed by the real-time communication software application 706, is further illustrated by reference to FIGS. 3, 4, 5 and 6.

Figure 3:
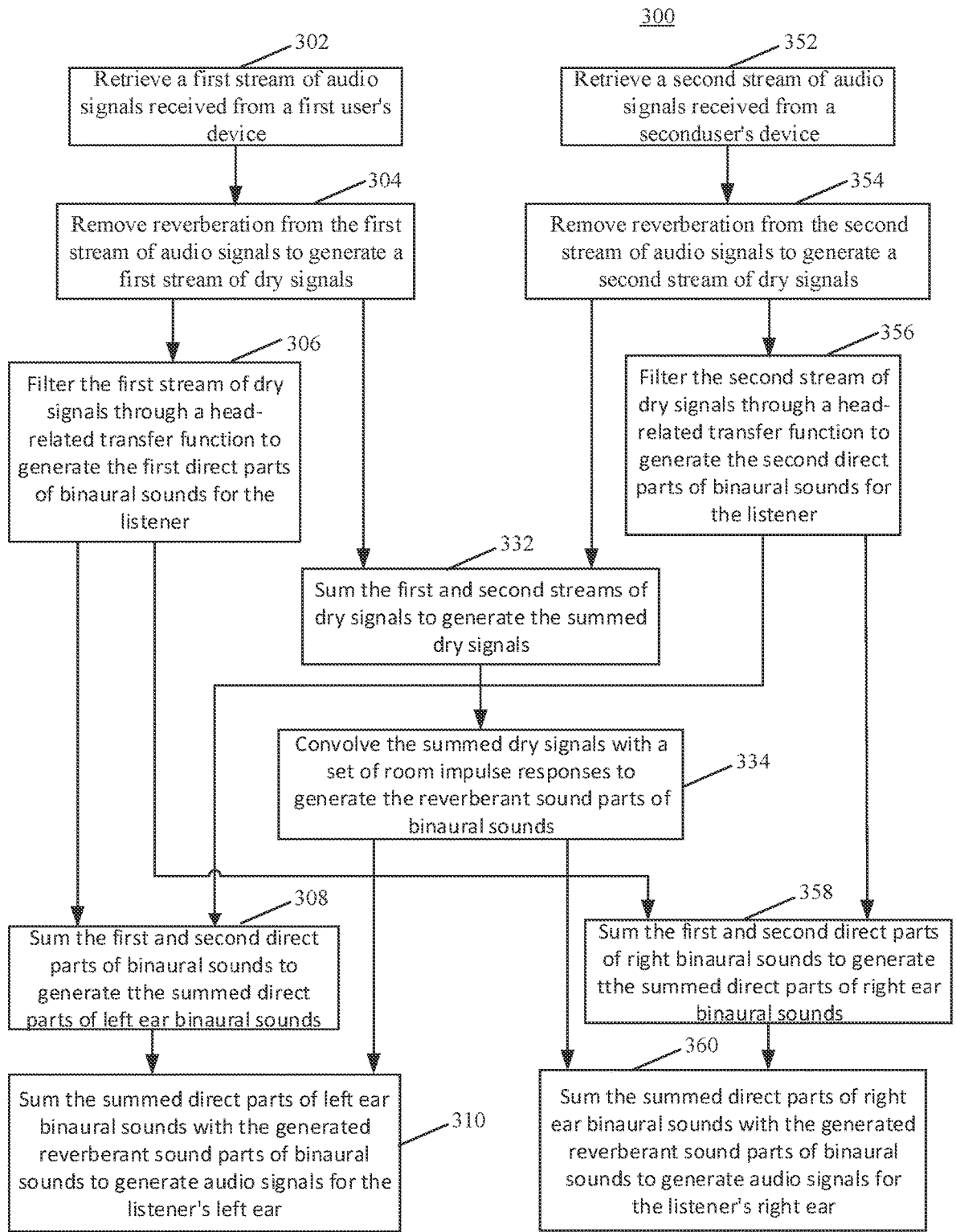
FIG. 3 is a flowchart illustrating a process by which spatial sounds from far-end participants with uniform reverberation in real-time communication are generated in accordance with this disclosure.

Turning first to FIG. 3, a flowchart illustrating a process by which the new real-time communication software application 706 generates spatial sounds from far-end participants (such as the users 102-104 and the devices 122-123 respectively) with uniform reverberation in VR scenarios is shown and generally indicated at 300. The process 300 also illustrates the data flow between the elements of the process. Speech of the users 102-104 is captured and transmitted over a network connection (such as the Internet) by their respective electronic devices 122-124 to the electronic device 126 for the participant 106. The audio data of their speech is transmitted in the form of audio signals. A stream of signals represents the audio data of a time period, such as one or two milliseconds. The device 126 outputs the processed audio signals with uniform reverberation to an audio output device, such as a speaker system.

At 302, the specialized real-time communication software application 706 retrieves a first stream of audio signals received from a first user's electronic device, such as the device 122. At 304, the real-time communication software application 706 removes reverberation from the first stream of signals to generate a first stream of dry signals. In one implementation, the process 200 is performed at 304. Alternatively, the process 250 is performed at 304. At 306, the real-time communication software application 706 filters the first stream of dry signals through a head-related transfer function (HRTF) with desired directions to generate the first direct parts of binaural sounds for the user 106. The desired directions are relative to the user 106 in the virtual conference room 116. HRTFs do not contain any room information, and can either be taken from available datasets, such as CIPIC database, MIT database, IRCAM database, or individually measured. As used herein, binaural sounds (also referred to herein as binaural signals) includes audio signals for the left ear and audio signals for the right ear.

At 352, the specialized real-time communication software application 706 retrieves a second stream of audio signals received from a second user's electronic device, such as the device 124. At 354, the real-time communication software application 706 removes reverberation from the second stream of signals to generate a second stream of dry signals. In one implementation, the process 200 is performed at 354. Alternatively, the process 250 is performed at 354. At 356, the real-time communication software application 706 filters the second stream of dry signals through a head-related transfer function with desired directions to generate the second direct parts of binaural sounds for the user 106.

At 332, the real-time communication software application 706 sums the first and second streams of dry signals to generate the summed dry signals. In RTC, the audio signals are usually processed in a frame-based manner, and the summation is done by adding the first and second frames (e.g., 480 samples for a 10 ms-frame with a sampling rate of 48 kHz) of dry signals together. At 334, the specialized real-time communication software application 706 convolves the summed dry signals with a set (meaning one or more) of room impulse responses (RIR) to generate the reverberant sound parts of the binaural sounds for the user 106. In one implementation, at 334, the room impulse responses consists of a pair of RIRs without the direct sound part to generate reverberant sound parts of binaural sounds. The RIRs include room-related auditory information of rooms. They can be either measured or artificially synthesized. It is important that the room-related auditory information contained in the pair of RIRs used should match that provided by the virtual room. The RIRs can be pre-configured and saved on a server computer system (such as a cloud server system). As an example, three categories of conference rooms can be defined based on the size: small, middle, and large. Hence, three sets of RIRs for these three categories of rooms can be pre-configured and saved on a server computer system. They can either be measured (measured in real rooms, but with the same size) or synthesized. In one implementation, based on the virtual conference room selected, the corresponding RIR is loaded from the server computer system and then used. At 334, the application 706 loads the saved RIRs from the server based on the selected virtual conference room. The direct-to-reverberant energy ratio (DRR) is chosen based on the virtual distance between the far-end participants and the listener. In the illustrative implementation, the far-end participants are the participants 102-104 and the listener is the participant 106.

At 308, the real-time communication software application 706 sums the first and second direct parts of binaural sounds for the left ear to generate the summed direct parts of left ear binaural sounds. In other words, the left ear binaural sounds of the first and second direct parts are summed. At 358, the real-time communication software application 706 sums the first and second direct parts of binaural sounds for the right ear to generate the summed direct parts of right ear binaural sounds. The left and right ear signals are different. One reason is the use of HRTFs, which simulate the acoustic transfer paths between a sound source to the listener's two ears. As an example, for the sound source at the right side, the signal for the right ear is louder than that for the left ear. In addition, the signal transmitted to the left ear is longer than the signal transmitted to the right ear. At 310, the real-time communication software application 706 sums the summed direct parts of left ear binaural sounds with the generated reverberant sound parts of binaural sounds to generate audio signals for the listener's left ear. At 360, the real-time communication software application 706 sums the summed direct parts of right ear binaural sounds with the generated reverberant sound parts of binaural sounds to generate audio signals for the listener's right ear. The audio signals from the elements 310 and 360 are provided to are then played back or otherwise output via an audio output device, such as a speaker system operatively coupled to the electronic device 126.

The density of reflections of sounds increases with time. The early reflections, which includes several discrete reflections from, for example, walls, ceilings and floors can be observed within a few milliseconds after the arrival of direct sounds. The temporal structure of early reflections depends highly on the room geometry and the positions of listeners and sound sources. They play an important role on source localization, coloration, and speech intelligibility. The late reverberation includes high-density reflections, and contributes to the listener's envelopment. The time point between the early reflections and the late reverberation is known as the mixing time. In order to generate more realistic reverberation, early reflections and the late reverberation should be generated separately.

Figure 4:
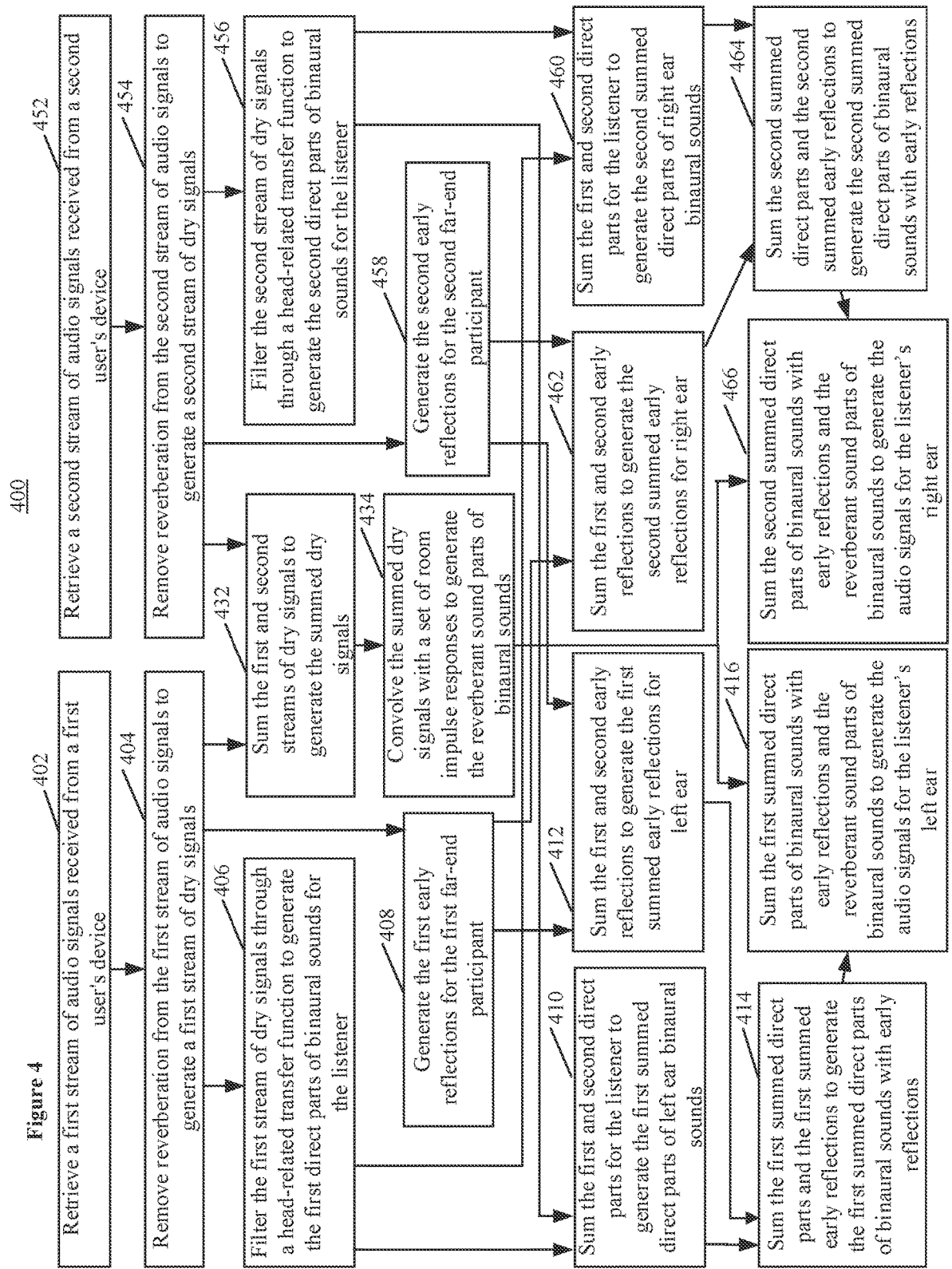
FIG. 4 is a flowchart illustrating a process for generating spatial audio with uniform reverberation and early reflections in real-time communication in accordance with this disclosure.

FIG. 4 illustrates a process for generating spatial audio with uniform reverberation in real-time communication that incorporates the processing of early reflections. Referring to FIG. 4, a flowchart illustrating a process by which the new real-time communication software application 706 generates spatial sounds from far-end participants (such as the users 102-104 and the devices 122-123 respectively) with uniform reverberation in VR scenarios with early reflections considered is shown and generally indicated at 400. The process 400 also illustrates the data flow between the elements of the process.

At 402, the specialized real-time communication software application 706 retrieves a first stream of audio signals from a first user's electronic device, such as the device 122. At 404, the real-time communication software application 706 removes reverberation from the first stream of signals to generate a first stream of dry signals. In one implementation, the process 200 is performed at 404. Alternatively, the process 250 is performed at 404. At 406, the real-time communication software application 706 filters the first stream of dry signals through a head-related transfer function (HRTF) with desired directions to generate the first direct parts of binaural sounds for the user 106. The desired directions are relative to the user 106 in the virtual conference room 116.

At 452, the specialized real-time communication software application 706 retrieves a second stream of audio signals from a second user's electronic device, such as the device 124. At 454, the real-time communication software application 706 removes reverberation from the second stream of signals to generate a second stream of dry signals. In one implementation, the process 200 is performed at 454. Alternatively, the process 250 is performed at 454. At 456, the real-time communication software application 706 filters the second stream of dry signals through a head-related transfer function with desired directions to generate the second direct parts of binaural sounds for the user 106.

At 432, the real-time communication software application 706 sums the first and second streams of dry signals to generate the summed dry signals. At 434, the specialized real-time communication software application 706 convolves the summed dry signals with a set of RIRs to generate the reverberant sound parts of the binaural sounds for the user 106. In one implementation, at 434, the set of RIRs consists of a pair of RIRs without the direct sound part to generate reverberant sound parts of binaural sounds. The RIRs can be either measured from a reference conference room or artificially synthesized. The RIRs can be pre-configured and saved on a server computer system (such as a cloud server system). At 434, the application 706 loads the saved RIRs from the server based on the selected virtual conference room. The direct-to-reverberant energy ratio is chosen based on the virtual distance between the far-end participants and the listener. In the illustrative implementation of the process 400, the far-end participants are the participants 102-104 and the listener is the participant 106.

At 408, the real-time communication software application 706 generates the first early reflections for the first far-end participant 102. At 458, the real-time communication software application 706 generates the second early reflections for the first far-end participant 104. The generation of the early reflections requires a room model (such as the geometry of the virtual conference room 100). In one implementation, the room model is a three-dimensional (3D) model of the room 100. In a different implementation, the room model is simply the room's dimensions.

The late reverberation part is calculated at 434 by convolution. Alternatively, the late reverberation part is synthesized using an artificial reverberator, such as the Schroeder reverberator, feedback delay network, scattering delay network, etc. The mixing time between the early reflections and late reverberation is determined by the geometry of the virtual room 100 or the reverberation time. Different formulas can be used to calculate the mixing time. In one implementation, the mixing time is determined using the formula below:

$$T_{mix} = 0.58 \cdot \sqrt{V} + 21.2$$

where V is the volume of the virtual conference room.

At 410, the real-time communication software application 706 sums the first and second direct parts of binaural sounds for the listener 106 to generate the first summed direct parts of left ear binaural sounds for the listener's left ear. At 460, the real-time communication software application 706 sums the first and second direct parts of right ear binaural sounds for the listener 106 to generate the second summed direct parts of binaural sounds.

At 412, the real-time communication software application 706 sums the first early reflections for the first far-end participant 102 and the second early reflections for the second far-end participant 104 in the virtual conference room 100 to generate the first summed early reflections for the listener's left ear. At 462, the real-time communication software application 706 sums the first early reflections for the first far-end participant 102 and the second early reflections for the second far-end participant 104 in the virtual conference room 100 to generate the second summed early reflections for the listener's right ear.

At 414, the real-time communication software application 706 sums the first summed direct parts of left ear binaural sounds and the first summed early reflections to generate the first summed direct parts of binaural sounds with early reflections for the listener's left ear. At 464, the real-time communication software application 706 sums the second summed direct parts of right ear binaural sounds and the second summed early reflections to generate the second summed direct parts of binaural sounds with early reflections for the listener's right ear.

At 416, the real-time communication software application 706 sums the first summed direct parts of binaural sounds with early reflections and the reverberant sound parts of binaural sounds to generate the audio signals for the listener's left ear. The reverberant sound parts of binaural sounds are uniform because the perceived reverberation of the speech signals from the users 102 and 104 is the same as that for the user 106. At 466, the real-time communication software application 706 sums the first summed direct parts of binaural sounds with early reflections and the reverberant sound parts of binaural sounds to generate the audio signals for the listener's right ear. The audio signals from the elements 416 and 466 are then played back or otherwise output via an audio output device, such as a stereo speaker system.

Figure 5:
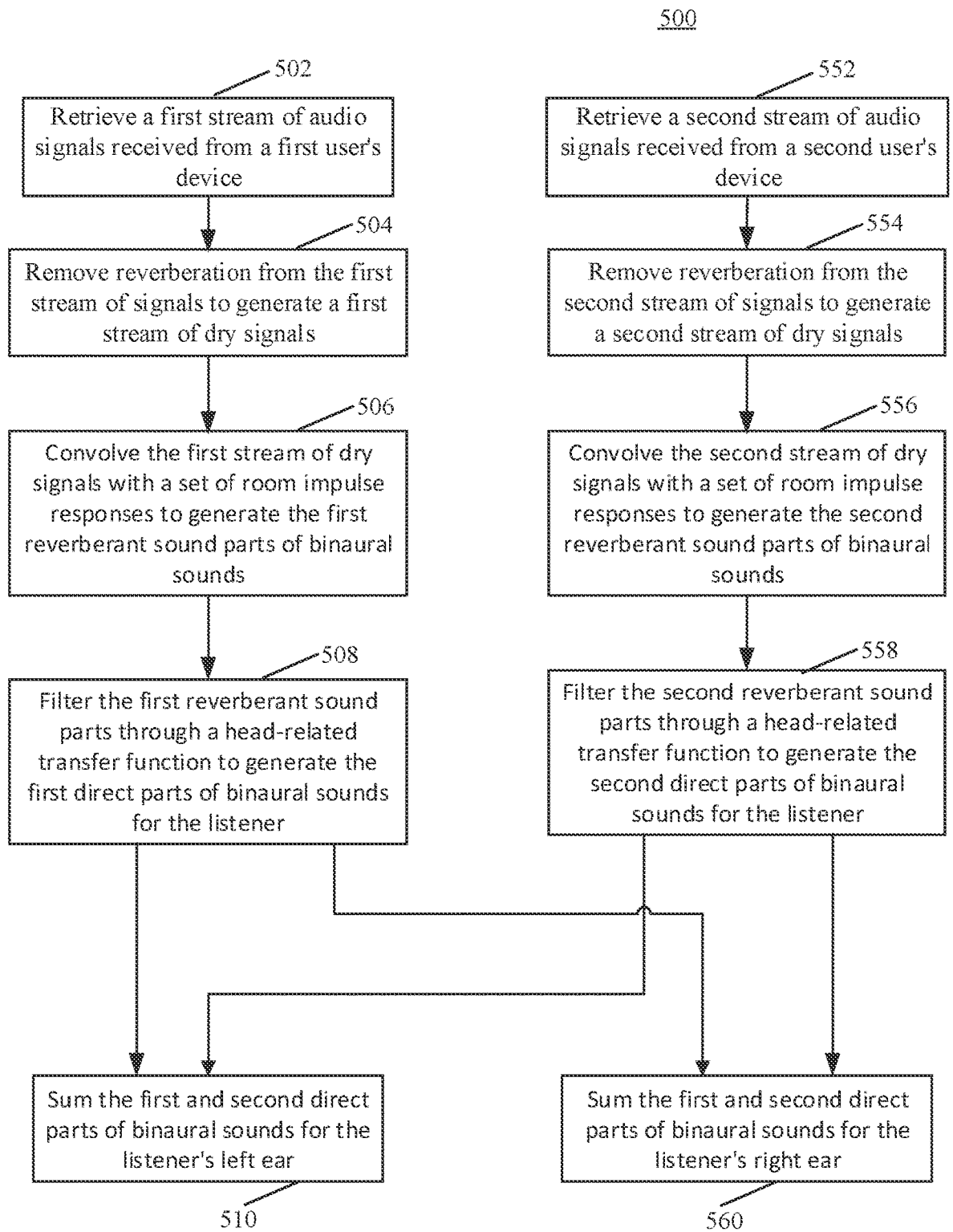
FIG. 5 is a flowchart illustrating a process by which spatial sounds with uniform reverberation in real-time communication are generated in accordance with this disclosure.

In an alternative process for generating spatial sound signals with uniform reverberation, reverberation is directly added to the dry speech signals after the dereverberation process. To do so, the dry signals are filtered with uniform RIRs (with direct sound part) or by using an artificial reverberator. The reverberant signals are then spatialized by HRTF filters. The process is further illustrated in FIG. 5. Referring to FIG. 5, a flowchart illustrating a process by which the special real-time communication software application 706 generates spatial sound signals with uniform reverberation is shown and generally indicated at 500.

At 502, the application 706 retrieves a first stream of audio signals from a first user's electronic device, such as the device 122. At 504, the real-time communication software application 706 removes reverberation from the first stream of signals to generate a first stream of dry signals. In one implementation, the process 200 is performed at 504. Alternatively, the process 250 is performed at 504. At 506, the specialized real-time communication software application 706 convolves the first stream of dry signals with a set of RIRs (such as a pair of RIRs) to generate the first reverberant sound parts of binaural sounds. At 508, the real-time communication software application 706 filters the first reverberant sound parts of binaural sounds to generate the first direct parts of binaural sounds for the listener 106.

At 552, the application 706 retrieves a second stream of audio signals from a second user's electronic device, such as the device 124. At 554, the real-time communication software application 706 removes reverberation from the second stream of signals to generate a second stream of dry signals. In one implementation, the process 200 is performed at 554. Alternatively, the process 250 is performed at 554. At 556, the specialized real-time communication software application 706 convolves the second stream of dry signals with a set of RIRs (such as a pair of RIRs) to generate the second reverberant sound parts of binaural sounds. At 558, the real-time communication software application 706 filters the second reverberant sound parts of binaural sounds to generate the second direct parts of binaural sounds for the listener 106.

At 510, the application 706 sums the first and second direct parts of binaural sounds for the listener's left ear. At 560, the application 706 sums the first and second direct parts of binaural sounds for the listener's right ear. The output signals for 508 and 558 are "binaural signals", i.e., left ear signal and right ear signal. In the diagram, the left outputs for 508 or 558 are the signals for left ear, and the right outputs for 508 or 558 are signals for the right ear. Therefore the input for 510 are the left ear signals from 508 and 558, while the input for 560 are the right ear signals from 508 and 558. The audio signals from the elements 510 and 560 are then played back or otherwise output via an audio output device, such as a speaker system.

In one implementation, the user 106 is equipped with the headset 118 to participate in the virtual reality conference room 100. When speaking with the headset 118, the speaker's 106 voice travels through the air, and is blocked by the headphone's 118 housing. It has a low-pass filtering effect. The present teachings teach a system and a method that simulates the high-frequency components, filtered by the housing, of the speaker's own voice transmitted through the air. The process to increase the immersive experience of the listener 106 with the headset 118 on is further illustrated by reference to FIG. 6.

Figure 6:
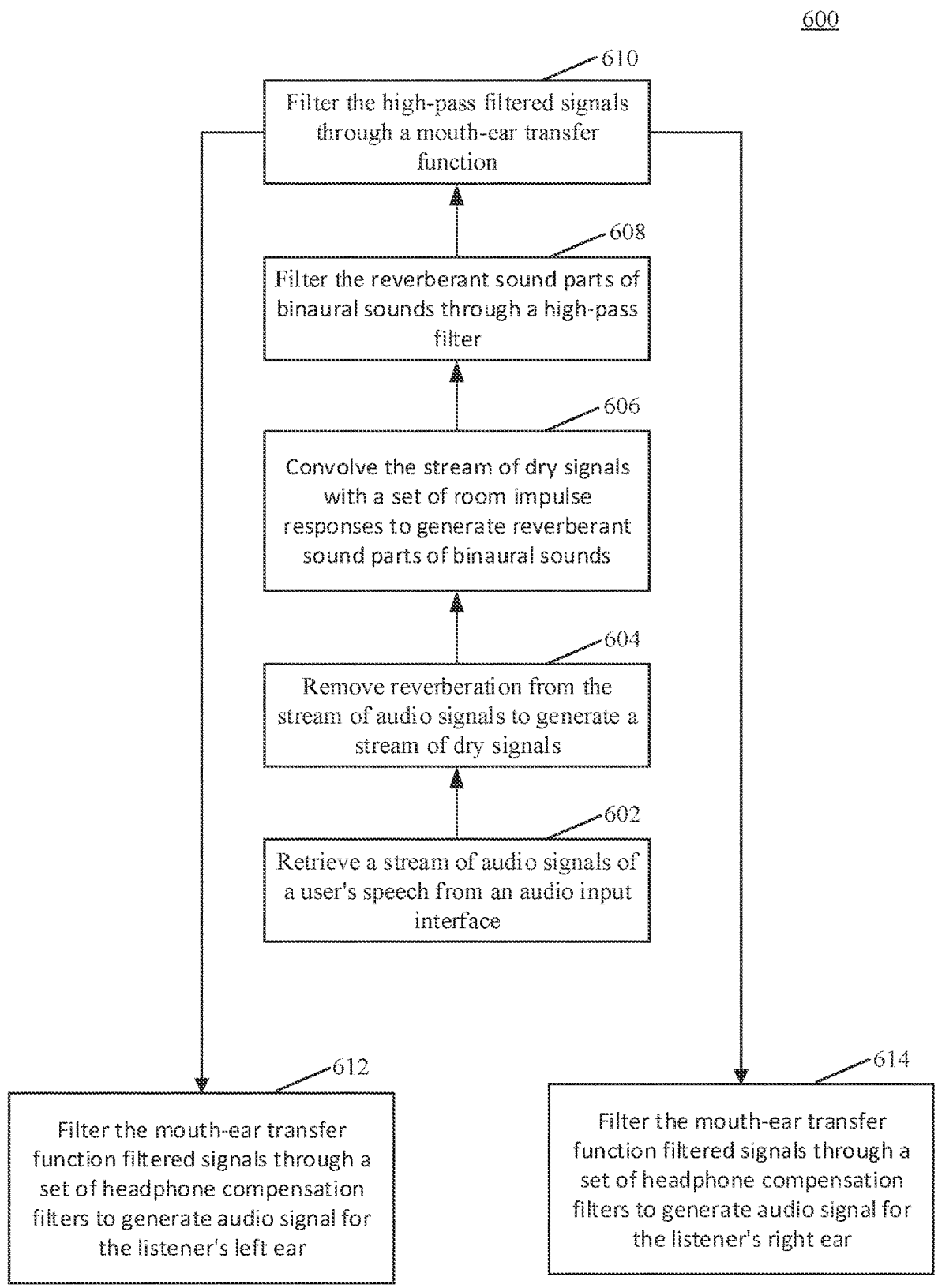
FIG. 6 is a flowchart illustrating a process by which spatial sounds with uniform reverberation when the listener uses a headset in real-time communication are generated in accordance with this disclosure.

Referring to FIG. 6, a flowchart illustrating a process by which the new real-time communication software application 706 generates spatial sounds with uniform reverberation in VR scenarios when the listener 106 uses the headset 118 to participate in a virtual reality conference room is shown and generally indicated at 600. The process 600 also illustrates the data flow between the elements of the process.

At 602, the specialized real-time communication software application 706 retrieves a stream of audio signals of the user's 106 speech. At 604, the application 706 removes reverberation from the stream of audio signals to generate a stream of dry signals. In one implementation, the process 200 is performed at 604. Alternatively, the process 250 is performed at 604. At 606, the application 706 convolves the stream of dry signals with a set of RIRs (such as a pair of RIRs) to generate reverberant sound parts of the binaural sounds. During the convolution, the direct-to-reverberant energy ratio is carefully be chosen according to the distance between the mouth and the microphone. At 608, the application 706 filters the reverberant sound parts of the binaural sounds through a high-pass filter. Since the headphone's 118 housing strongly attenuates the high-frequency part, but not the low-frequency part, the audio signals are filtered by a high-pass filter with a cut-off frequency of around, for example, 1 kHz in one implementation. At 610, the application 706 filters the high-pass filtered signals through a mouth-ear transfer function (METF). In one implementation, METFs are measured with dummy heads, such as head-torso simulators.

At 612, the application 706 filters the mouth-ear transfer function filtered signals through a set of headphone compensation filters (HpCFs) to compensate for the effect of headphones to generate audio signal for the listener's left ear. At 614, the application 706 filters the mouth-ear transfer function filtered signals through a set of headphone compensation filters to compensate for the effect of headphones to generate audio signal for the listener's right ear. The signals from the elements 612 and 614 are transmitted to the headset 118.

The delay of the signal processing chain should match the real transmission delay of the speech signal from the mouth to the ears. The desired delay of the speech signal from the mouth to the ears can be determined by the onset delay (i.e., linear phase part) of the METF. In signal processing, the onset delay of METFs should be removed in order to reserve time for other signal processing units. The position of the microphone is especially important. The distance between the mouth and the microphone should be as small as possible and not greater than the distance between the mouth and the ears. The processing time depends on the computational power, the position of the microphone, and the order of different filters. Some elements, such as the dereverberation and HpCF filtering, can be pre-determined and stored to minimize the processing time in real-time communication. If the delay introduced by the signal processing is less than the desired delay from the mouth to the ears, additional delay can be added.

Figure 8:
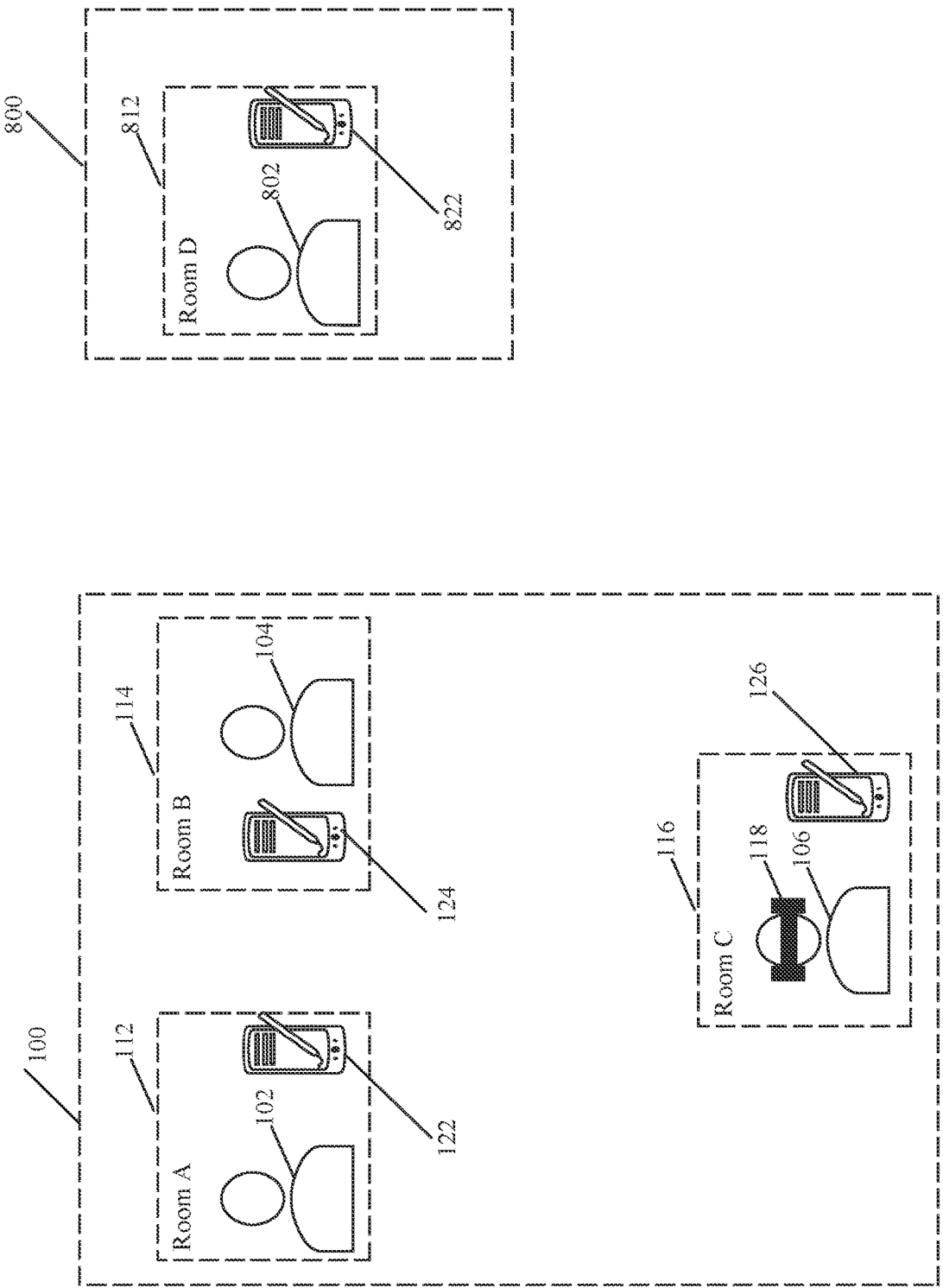
FIG. 8 is a simplified block diagram illustrating two virtual conference rooms in real-time communication in accordance with this disclosure.

Referring to FIG. 8, a block diagram illustrating two different virtual conference rooms in real-time communications is shown. The second virtual conference room is indicated at 800. The participant 802 operating an electronic communication device 822 resides inside a physical room 812. The rooms 100 and 800 are said be coupled rooms herein.

The present teachings provide a system and a method for increasing the immersive experience for both listeners and speakers in different virtual conference rooms. The reverberation of the recorded audio signals by a microphone is removed to generate the dry signals, which are used to simulate the direct and reverberant sound parts. The main difference is the use of RIR for generating reverberant sounds between the single virtual conference room scenario and the multiple virtual conference room scenario. For the single virtual conference room scenario, only the reverberation for one virtual conference room needs to be considered. In contrast, in the multiple virtual conference room scenario, the reverberation of two different virtual rooms should be coupled to simulate the effect that the speakers are in one room while the listeners are in another room.

Usually, the envelope of the reverberant part in RIR is approximated by an exponential function:

$$h_{env}(t) = \gamma e^{-\left(\frac{t}{T}\right)}, \text{ for } t > 0$$

where $\gamma$ is the weighting and T is the decay rates of the slope. T depends on the reverberation time of the room. One simple way to generate the reverberant part in RIR is to multiply $h_{env}(t)$ with white noise. This can be done in different frequency bands.

In the case of coupled room, the envelope of the reverberant part can be considered as a linear combination of two envelopes of reverberation in two rooms:

$$h_{env}(t) = \gamma_0 + \gamma_A e^{-\left(\frac{t}{T_A}\right)} + \gamma_B e^{-\left(\frac{t}{T_B}\right)}, \text{ for } t > 0$$

where A and B refer to rooms A and B, respectively. It is also possible to simulate the reverberation of coupled room with artificial reverberator, such as grouped feedback delay network, etc. The early reflection parts can be simulated separately using the image-source method, ray-tracing method, etc., depending on the position of listeners, speakers, and the coupled rooms' geometry.

Obviously, many additional modifications and variations of the present disclosure are possible in light of the above teachings. Thus, it is to be understood that, within the scope of the appended claims, the disclosure may be practiced otherwise than is specifically described above.

The foregoing description of the disclosure has been presented for purposes of illustration and description, and is not intended to be exhaustive or to limit the disclosure to the precise form disclosed. The description was selected to best explain the principles of the present teachings and practical application of these principles to enable others skilled in the art to best utilize the disclosure in various embodiments and various modifications as are suited to the particular use contemplated. It should be recognized that the words "a" or "an" are intended to include both the singular and the plural. Conversely, any reference to plural elements shall, where appropriate, include the singular.

It is intended that the scope of the disclosure not be limited by the specification, but be defined by the claims set forth below. In addition, although narrow claims may be presented below, it should be recognized that the scope of this invention is much broader than presented by the claim(s). It is intended that broader claims will be submitted in one or more applications that claim the benefit of priority from this application. Insofar as the description above and the accompanying drawings disclose additional subject matter that is not within the scope of the claim or claims below, the additional inventions are not dedicated to the public and the right to file one or more applications to claim such additional inventions is reserved.

What is claimed is:

1. A real-time communication software application stored on non-transitory computer readable medium and adapted to be executed by a processing unit for generating spatial audio with uniform reverberation in a real-time communication session, said real-time communication software application adapted to:
   1) retrieve a first stream of audio signals from a first electronic communication device via a network interface of an electronic communication device, wherein said real-time communication software application adapted to be executed by said electronic communication device for generating spatial audio with uniform reverberation in a real-time communication session, wherein said electronic communication device including:
      (a) a processing unit;
      (b) a memory element operatively coupled to said processing unit;
      (c) an audio input interface operatively coupled to said processing unit;
      (d) an audio output interface operatively coupled to said processing unit;
      (e) a video input interface operatively coupled to said processing unit;
      (f) a video output interface operatively coupled to said processing unit; and
      (g) said network interface operatively coupled to said processing unit;
   2) remove reverberation from said first stream of audio signals to generate a first stream of dry signals;
   3) filter said first stream of dry signals through a head-related transfer function to generate a first direct parts of binaural sounds for a listener;
   4) retrieve a second stream of audio signals from a second electronic communication device via said network interface;
   5) remove reverberation from said second stream of audio signals to generate a second stream of dry signals;
   6) filter said second stream of dry signals through a head-related transfer function to generate a second direct parts of binaural sounds for said listener;
   7) sum said first and second streams of dry signals to generate summed dry signals;
   8) convolve said summed dry signals with a set of room impulse responses to generate reverberant sound parts of binaural sounds;
   9) sum said first and second direct parts of binaural sounds to generate summed direct parts of left ear binaural sounds;
   10) sum said first and second direct parts of binaural sounds to generate summed direct parts of right ear binaural sounds;
   11) sum said summed direct parts of left ear binaural sounds with said reverberant sound parts of binaural sounds to generate audio signals for said listener's left ear; and
   12) sum said summed direct parts of right ear binaural sounds with said reverberant sound parts of binaural sounds to generate audio signals for said listener's left ear.

2. The real-time communication software application stored on non-transitory computer readable medium and adapted to be executed by a processing unit for generating spatial audio with uniform reverberation of claim 1, wherein said real-time communication session is a real-time virtual reality communication session.

3. The real real-time communication software application stored on non-transitory computer readable medium and adapted to be executed by a processing unit for generating spatial audio with uniform reverberation of claim 1, where said set of room impulse responses consists of a pair of room impulse responses.

4. The real-time communication software application stored on non-transitory computer readable medium and adapted to be executed by a processing unit for generating spatial audio with uniform reverberation of claim 3, wherein each room impulse response within said set of room impulses is measured from a reference conference room or artificially synthesized.

5. The real-time communication software application stored on non-transitory computer readable medium and adapted to be executed by a processing unit for generating spatial audio with uniform reverberation of claim 1, wherein said removing reverberation from said first stream of audio signals to generate said first stream of dry signals uses a dereverberation model.

6. The real-time communication software application stored on non-transitory computer readable medium and adapted to be executed by a processing unit for generating spatial audio with uniform reverberation of claim 5, wherein said removing reverberation from said second stream of audio signals to generate said second stream of dry signals uses said dereverberation model.

7. A real-time communication software application stored on non-transitory computer readable medium and adapted to be executed by a processing unit for generating spatial audio with uniform reverberation in a real-time communication session, said real-time communication software application adapted to:
   1) retrieve a first stream of audio signals from a first electronic communication device via a network interface of an electronic communication device, wherein said real-time communication software application adapted to be executed by said electronic communication device for generating spatial audio with uniform reverberation in a real-time communication session, wherein said electronic communication device including:

(a) a processing unit;
(b) a memory element operatively coupled to said processing unit;
(c) an audio input interface operatively coupled to said processing unit;
(d) an audio output interface operatively coupled to said processing unit;
(e) a video input interface operatively coupled to said processing unit;
(f) a video output interface operatively coupled to said processing unit; and
(g) said network interface operatively coupled to said processing unit;

2) remove reverberation from said first stream of audio signals to generate a first stream of dry signals;
3) filter said first stream of dry signals through a head-related transfer function to generate a first direct parts of left ear binaural sounds for a listener;
4) retrieve a second stream of audio signals from a second electronic communication device via said network interface;
5) remove reverberation from said second stream of audio signals to generate a second stream of dry signals;
6) filter said second stream of dry signals through a head-related transfer function to generate a second direct parts of right ear binaural sounds for said listener;
7) generate first early reflections for a first far-end participant corresponding to said first electronic communication device;
8) generate second early reflections for a second far-end participant corresponding to said second electronic communication device;
9) sum said first and second streams of dry signals to generate summed dry signals;
10) convolve said summed dry signals with a set of room impulse responses to generate reverberant sound parts of binaural sounds;
11) sum said first and second direct parts of binaural sounds to generate summed direct parts of left ear binaural sounds;
12) sum said first and second direct parts of binaural sounds to generate summed direct parts of right ear binaural sounds;
13) sum said first and second early reflections to generate first summed early reflections for a left ear of said listener;
14) sum said first and second early reflections to generate second summed early reflections for a right ear of said listener;
15) sum said first summed direct parts of left ear binaural sounds and said first summed early reflections for said left ear;
16) sum said first summed direct parts of left ear binaural sounds and said first summed early reflections for said left ear to generate first summed direct parts of binaural sounds with early reflections for said left ear;
17) sum said second summed direct parts of right ear binaural sounds and said second summed early reflections for said right ear to generate second summed direct parts of binaural sounds with early reflections for said right ear;
18) sum said first summed direct parts of binaural sounds with early reflections for said left ear and said reverberant sound parts of binaural sounds to generate audio signals for said left ear; and
19) sum said second summed direct parts of binaural sounds with early reflections for said right ear and said reverberant sound parts of binaural sounds to generate audio signals for said right ear.

8. The real-time communication software application stored on non-transitory computer readable medium and adapted to be executed by a processing unit for generating spatial audio with uniform reverberation of claim 7, wherein said real-time communication session is a real-time virtual reality communication session.

9. The real-time communication software application stored on non-transitory computer readable medium and adapted to be executed by a processing unit for generating spatial audio with uniform reverberation of claim 7, where said set of room impulse responses consists of a pair of room impulse responses.

10. The real-time communication software application stored on non-transitory computer readable medium and adapted to be executed by a processing unit for generating spatial audio with uniform reverberation of claim 9, wherein each room impulse response within said set of room impulses is measured from a reference conference room or artificially synthesized.

11. The real-time communication software application stored on non-transitory computer readable medium and adapted to be executed by a processing unit for generating spatial audio with uniform reverberation of claim 7, wherein said removing reverberation from said first stream of audio signals to generate said first stream of dry signals uses a dereverberation model.

12. The real-time communication software application stored on non-transitory computer readable medium and adapted to be executed by a processing unit for generating spatial audio with uniform reverberation of claim 11, wherein said removing reverberation from said second stream of signals to generate said second stream of dry signals uses said dereverberation model.

13. A real-time communication software application stored on non-transitory computer readable medium and adapted to be executed by a processing unit for generating spatial audio with uniform reverberation in a real-time communication session for a user with a headset on, said real-time communication software application adapted to:
1) retrieve a stream of audio signals of said user's speech from an audio input interface via a network interface, wherein said real-time communication software application adapted to be executed by said electronic communication device for generating spatial audio with uniform reverberation in a real-time communication session, wherein said electronic communication device including;
    (a) a processing unit;
    (b) a memory element operatively coupled to said processing unit;
    (c) said audio input interface operatively coupled to said processing unit;
    (d) an audio output interface operatively coupled to said processing unit;
    (e) a video input interface operatively coupled to said processing unit;
    (f) a video output interface operatively coupled to said processing unit; and
    (g) said network interface operatively coupled to said processing unit;
2) remove reverberation from said stream of audio signals to generate a stream of dry signals;

3) convolve said stream of dry signals with a set of room impulse responses to generate reverberant sound parts of binaural sounds;
4) filter said reverberant sound parts of binaural sounds through a high-pass filter, thereby forming high-pass filtered signals;
5) filter said high-pass filtered signals through a mouth-ear transfer function, thereby forming mouth-ear transfer function filtered signals;
6) filter said mouth-ear transfer function filtered signals through a set of headphone compensation filters to generate audio signal for said user's left ear; and
7) filter said mouth-ear transfer function filtered signals through a set of headphone compensation filters to generate audio signal for said user's right ear.

14. The real-time communication software application stored on non-transitory computer readable medium and adapted to be executed by a processing unit for generating spatial audio with uniform reverberation of claim 13, wherein said real-time communication session is a real-time virtual reality communication session.

15. The real-time communication software application stored on non-transitory computer readable medium and adapted to be executed by a processing unit for generating spatial audio with uniform reverberation of claim 13, where said set of room impulse responses consists of a pair of room impulse responses.

16. The real-time communication software application stored on non-transitory computer readable medium and adapted to be executed by a processing unit for generating spatial audio with uniform reverberation of claim 15, wherein each room impulse response within said set of room impulses is measured from a reference conference room or artificially synthesized.

17. The real-time communication software application stored on non-transitory computer readable medium and adapted to be executed by a processing unit for generating spatial audio with uniform reverberation of claim 13, wherein said removing reverberation from said stream of audio signals to generate said stream of dry signals uses a dereverberation model.

* * * * *